United States Patent [19]
Hara et al.

[11] Patent Number: 5,553,573
[45] Date of Patent: Sep. 10, 1996

[54] VALVE DURATION CONTROL SYSTEM FOR FOUR-CYCLE ENGINE

[75] Inventors: Seinosuke Hara; Naoki Tomisawa, both of Atsugi, Japan

[73] Assignee: Unisia Jecs Corporation, Atsugi, Japan

[21] Appl. No.: 510,561

[22] Filed: Aug. 2, 1995

[30] Foreign Application Priority Data

Aug. 8, 1994 [JP] Japan ................................ 6-185057

[51] Int. Cl.$^6$ .................................................. F01L 13/00
[52] U.S. Cl. ................................ 123/90.15; 123/90.17; 123/90.31; 74/568 R
[58] Field of Search ......................... 123/90.15, 90.16, 123/90.17, 90.31, 90.6; 74/568 R

[56] References Cited

U.S. PATENT DOCUMENTS

| | | | |
|---|---|---|---|
| 5,046,461 | 9/1991 | Kanehiro et al. | 123/90.15 |
| 5,133,310 | 7/1992 | Hitomi et al. | 123/90.15 |
| 5,222,465 | 6/1993 | Sakamoto et al. | 123/90.15 |
| 5,275,137 | 1/1994 | Uesugi | 123/90.16 |
| 5,293,741 | 3/1994 | Kashiyama et al. | 60/284 |
| 5,333,579 | 8/1994 | Hara et al. | 123/90.17 |
| 5,365,896 | 11/1994 | Hara et al. | 123/90.17 |
| 5,482,012 | 1/1996 | Yoshioka | 123/90.17 |

FOREIGN PATENT DOCUMENTS

| | | |
|---|---|---|
| 62-191636 | 8/1987 | Japan . |
| 2-42105 | 2/1990 | Japan . |
| 2282465 | 4/1995 | United Kingdom . |

Primary Examiner—Weilun Lo
Attorney, Agent, or Firm—Foley & Lardner

[57] ABSTRACT

A control system for a four-cycle internal combustion engine controls a cam drive mechanism for an intake valve such that a cam of the cam drive mechanism maintains a valve open duration of the intake valve at a short valve open duration in response to a shift from engine operation at low speed with low load to engine operation at low speed with high load, and the cam increases the valve open duration of the intake valve in response to a shift from engine operation at low speed with low load to engine operation at low speed with middle load that is higher than the low load but lower than the high load.

10 Claims, 9 Drawing Sheets

VALVE DURATION CONTROL SYSTEM FOR FOUR-CYCLE ENGINE

BACKGROUND OF THE INVENTION

The present invention relates to a system for controlling a four-cycle automobile internal combustion engine and more particularly to a valve duration control system for such an engine.

In controlling a four-cycle automobile internal combustion engine, it is known from JP-A 62-191636 to retard timing at which an intake valve opens and timing at which the intake valve closes to decrease an overlapping between exhaust and intake periods when engine speed is lower than a predetermined engine speed value and engine load is less than a predetermined engine load value to improve combustion efficiency to fit engine operation at low speed with low load, and to advance timing at which the intake valve closes toward bottom dead center (BDC) as well as timing at which the intake valve opens when engine speed is lower than the predetermined engine speed but the engine load is not less than the predetermined engine load to enhance charging efficiency for increased output torque during engine operation at low speed with high load. JP-A 62-191636 proposes use of a variable valve timing mechanism, employing a single cam profile, to shift the timings of the intake valve with valve duration unaltered.

JP-A 2-42105 proposes to conduct a shift between valve actuation by low speed cam and valve actuation by high speed cam when engine output produced by valve timing of low speed cam is generally equal to engine output produced by valve timing of high speed cam in order to suppress shocks during the shift.

According to JP-A 62-191636, the valve closing timing remains delayed with respect to BDC during a shift from engine operation at low speed with low load to engine operation at low speed with middle load that is less than the predetermined engine load value, causing unsatisfactory charging efficiency and poor acceleration. In case of rapid acceleration to cause an increase from low engine load to high engine load that exceeds the predetermined engine load value during operation at low speed, a sufficiently quick increase in charging efficiency is not expected owing to a delay in hydraulic actuator of the variable valve timing mechanism, causing unsatisfactory performance at rapid acceleration.

According to the control strategy taught by JP-A 2-42105, a difference in engine torque during a shift can be suppressed. However, the shift progresses during a valve closing period within one revolution of camshaft. In other words, the torque difference occurs during a very short period of time. Thus, it is difficult to suppress torque shock to a satisfactorily low level. Besides, according to this known control strategy, the shift is prohibited unless engine output produced by valve timing of low speed cam is generally equal to engine output produced by valve timing of high speed cam. Specifically, the shift is prohibited during engine operation at low speed.

An object of the present invention is to improve a valve duration control system of a four-cycle automobile internal combustion engine such that acceleration performance from engine operation at low speed with low load to engine operation at low speed with high load is improved and production of NOx is suppressed during engine operation at low speed with middle load.

SUMMARY OF THE INVENTION

The invention uses a cam drive mechanism including a driving shaft rotatable about a shaft axis and driven to rotate about the shaft axis in response to crankshaft rotation of an automobile four-cycle internal combustion engine, and a cam in driving connection with an engine intake valve to open the intake valve. The cam is rotatable, about the shaft axis, relative to the driving shaft. The cam has a drive connection from the driving shaft which includes a drive member rotatable with the driving shaft, a support, and an intermediate member supported in the support for rotation about an axis thereof. The drive member is coupled with the intermediate member by a first coupling at a first position spaced from the shaft axis, and the cam is coupled with the intermediate member by a second coupling at a second position angularly spaced from the first position with respect to the shaft axis. Each of the first and second coupling has a movable connection with the intermediate member to permit variation in its distance from the axis of the intermediate member during operation. The support is positionable in response to a control signal between a concentric position in which the intermediate member is concentric with the driving shaft and an eccentric position in which the axis of the intermediate member is eccentric with the shaft axis of the driving shaft. Controller means develops the control signal for positioning the support in response to varying operating condition of the engine. According to the invention, the controller means generates the control signal for positioning said support to said eccentric position during engine operation at low speed with low load, the controller means generates said control signal for positioning said support to said eccentric position in response to shift from engine operation at low speed with low load to engine operation at low speed with high load, and the controller means generates said control signal for positioning said support to said concentric position in response to shift from engine operation at low speed with low load to engine operation at low speed with middle load that is higher than the low load but lower than the high load.

DETAILED DESCRIPTION OF THE INVENTION

Figure 1:
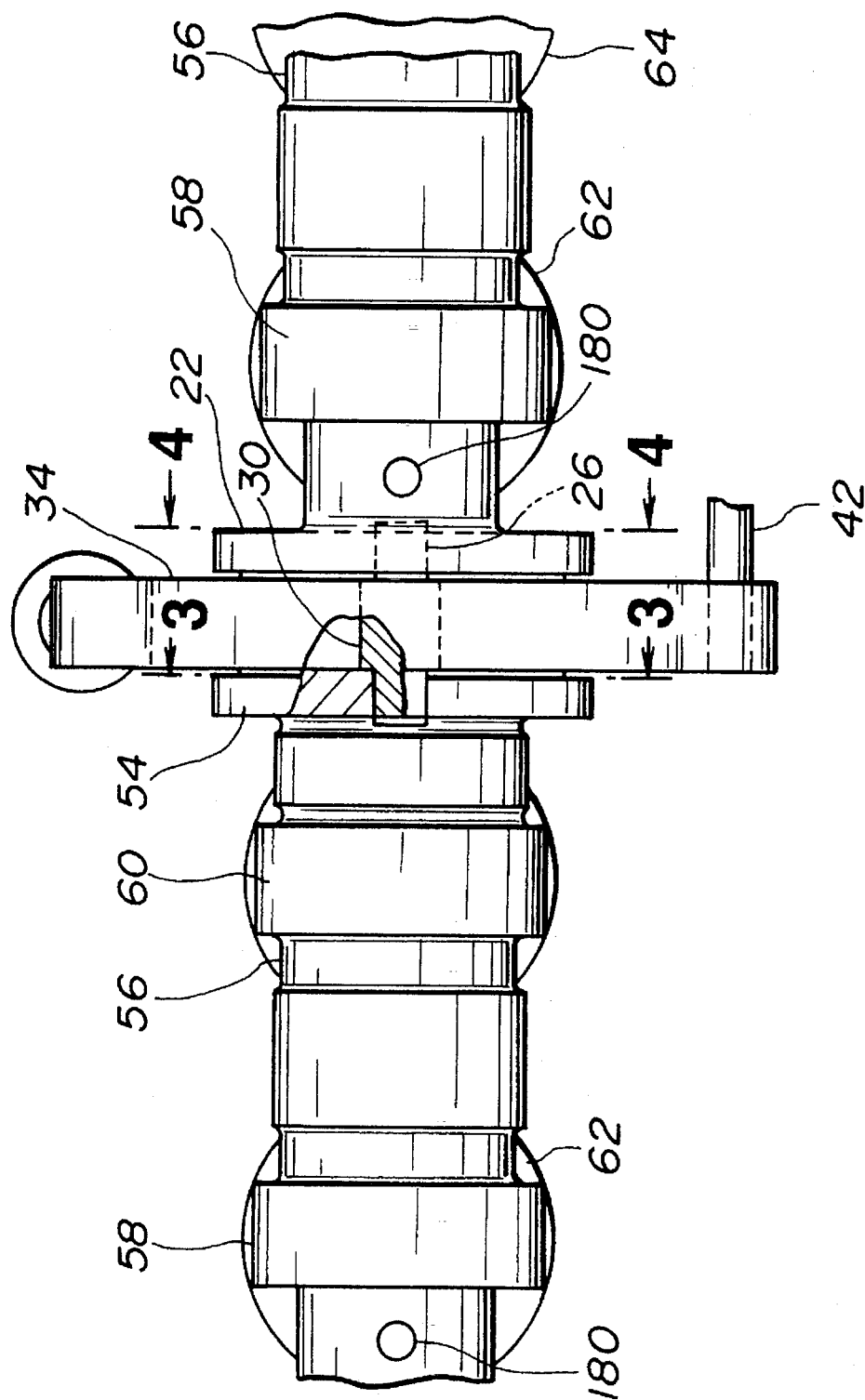
FIG. 1 is a fragmentary plan view of an automobile four-cycle internal combustion engine with an intake camshaft assembly arranged over intake cylinder valves.

Referring to FIGS. 1 to 6, there is described a preferred embodiment of a valve duration control system according to the present invention as applied to an automobile internal combustion engine. The engine has a throttle which opens in degrees in controlling flow rate of combustible charge to the cylinder via intake valves. The intake valves are driven by a mechanism which is described hereinafter, while exhaust valves are actuated by exhaust cams, respectively, fixed to an exhaust camshaft driven by the engine crankshaft.

Basically, the mechanism comprises a drive member, in the form of a drive collar 22, rotatable with a driving shaft 10. The drive collar 22 is formed with a radial slot 24. An intermediate member, in the form of an annular disc 28, has a pin 26 projecting from its one face into the radial slot 24 of the drive collar 22. The annular disc 28 is fitted around the driving shaft 10 with ample radial clearance (see FIG. 5), and has another pin 30 projecting from its opposite face into a radial slot 52 cut in a driven collar 54, forming an integral part of a cam 56 whose movement is being controlled.

The cam 56 is mounted on the driving shaft 10 for rotation relative thereto. The disc 28 is supported in a bearing 36 of a support or a disc housing 34 which itself can be moved to vary the eccentricity of the disc 28 with respect to the driving shaft 10. By reason of the differing positions in which this disc 28 can be placed within the plane of rotation, and thus by reason of the different positions of the radial slot 24 of the drive collar 22 engaged by the pin 26 of the disc 28 and the radial slot 52 of the driven collar 54 engaged by the pin 30 of the disc 28, the angular speed imparted to the cam 56 at different rotational positions can be varied.

This mechanism is described in U.S. Pat. No. 5,333,579, Hara et al., issued on Aug. 2, 1994. This U.S. Patent has corresponding applications, namely, GB 2 263 529 A published on Jul. 28, 1993 and DE 43 02 246 A1 published on Jul. 29, 1993. Modified version of the mechanism is described in U.S. Pat. No. 5,365,896, Hara et al., issued on Nov. 22, 1994. This U.S. Patent has corresponding applications, namely, GB 2 268 246 published on Jan. 5. 1994 and DE 43 20 126 A1 published on Dec. 23, 1993.

The mechanism will now be considered in more detail.

The mechanism is applied to one double cam 56 with two cam lobes 58 and 60 which control tappets of two intake valves 62 and 64 for the corresponding one of cylinders of an automobile four-cycle internal combustion engine. The driving shaft 10 which drives all the cams, is rotatable by conventional means such as a toothed wheel and a chain. The cams 56 are not integral with the shaft 10, but rotatable relative to the shaft 10. Their movement is restricted in a longitudinal direction.

The drive collar 22 is mounted coaxially with the shaft 10 for rotation therewith by means of a cotter 180 and has a sleeve 182 rotatably received by the adjacent cam 56. The radial slot 24 is slidably engaged by the first pin 26 of the annular disc or intermediate member 28. The pin 26 is rotatably supported by the disc 28 and projects from one face of the disc 28 into the radial slot 24. Projecting from the opposite face of the disc 28 is the pin 30 which is symmetrical to and preferrably angularly displaced through 180 degrees from the pin 26.

The central hole 32 of the disc 28 is wide and the disc 28 does not touch the surface of the driving shaft 10, but is free to move into positions eccentric with respect to the driving shaft 10. The disc housing or support 34 has bearing 36 which supports the disc 28 for rotation. The disc housing 34 is movable to move the disc 28 in a plane perpendicular to the axis X of the shaft 10. The disc housing 34 has a hole 38 which rotatably receives a pivot shaft 42 such that the disc housing 34 can tilt about the pivot shaft axis X. The disc housing 34 has a handle 224 (see FIG. 2) which is angularly displaced through 180 degrees from the hole 38.

The pin 30 is rotatably supported by the disc 28 and can slide along the radial slot 52 of the driven collar 54, forming an integral part and thus rotatable with the cam 56. The cam 56 is freely rotatable on the shaft 10, but cannot slide in a longitudinal direction. The cam 56 has two cam lobes 58 and 60 which control tappets 62 and 64 of two intake valves 66 and 68 for one cylinder.

The cam 56 is supported through two cam brackets 70 and 72, by the engine cylinder head 74.

Figure 2:
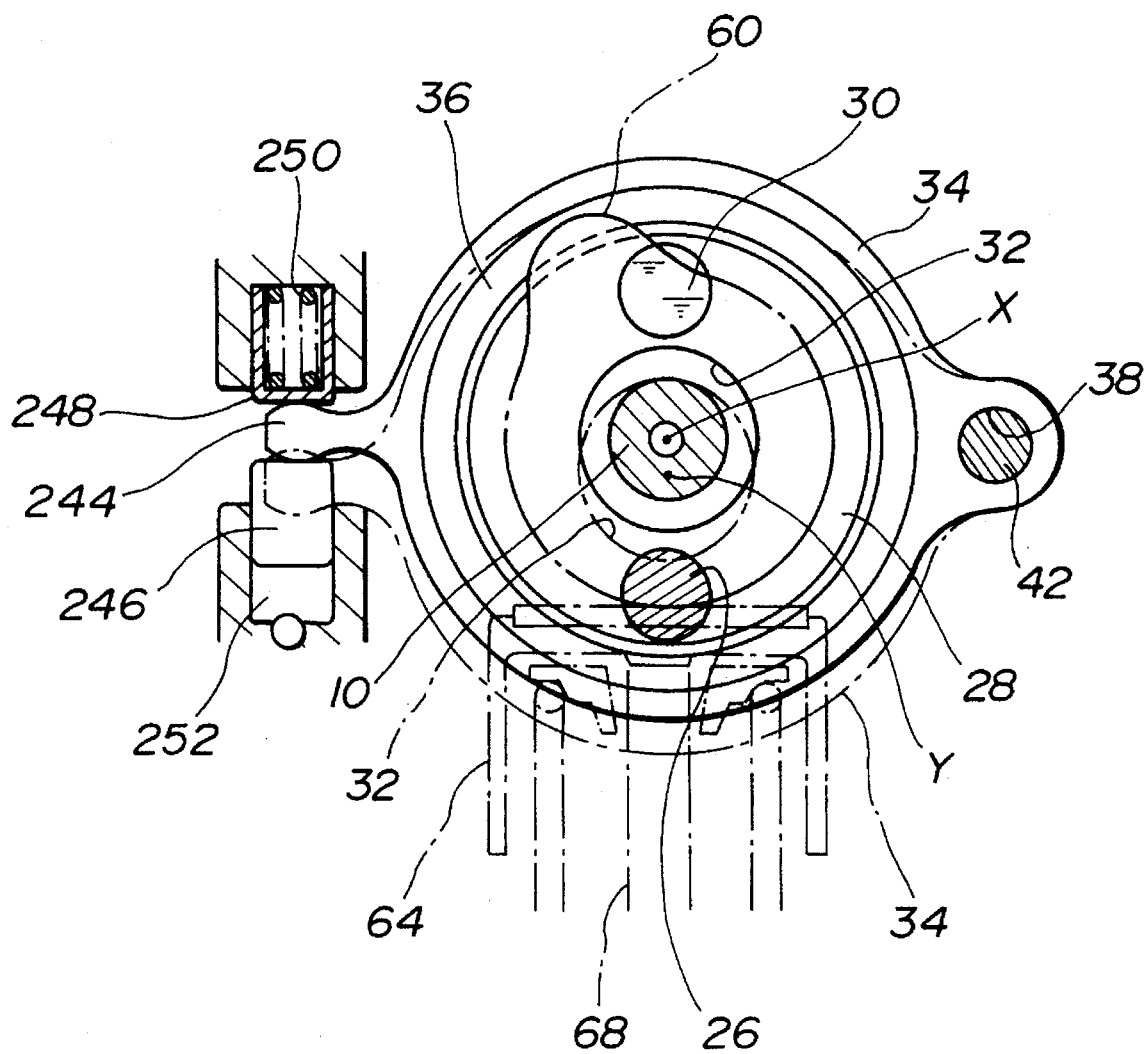
FIG. 2 is a sectional view taken through the line 2—2 in FIG. 5.
Figure 3:
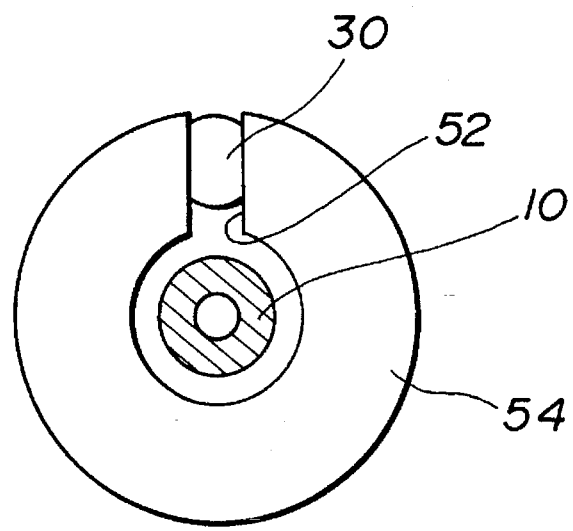
FIG. 3 is a sectional view taken through the line 3—3 in FIG. 1.
Figure 4:
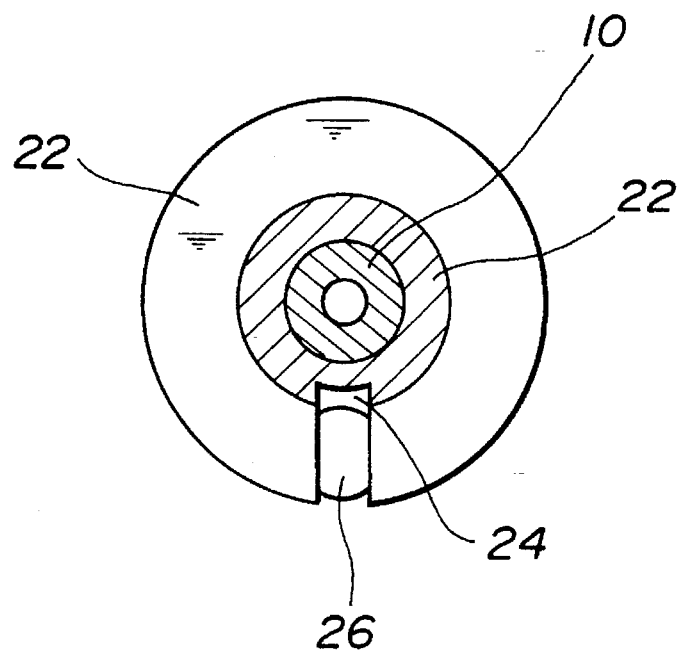
FIG. 4 is a sectional view taken through the line 4—4 in FIG. 1.

The handle 224 is held in contact with a hydraulic piston 246 owing to a plunger 248 biased by a compression spring 250 so that the disc housing 34 can tilt about the pivot shaft 42 between a spring set first position as illustrated by the phantom line in FIG. 2 and a second position as illustrated by the fully drawn line in FIG. 2 in response to movement of the hydraulic piston 246.

Figure 6:
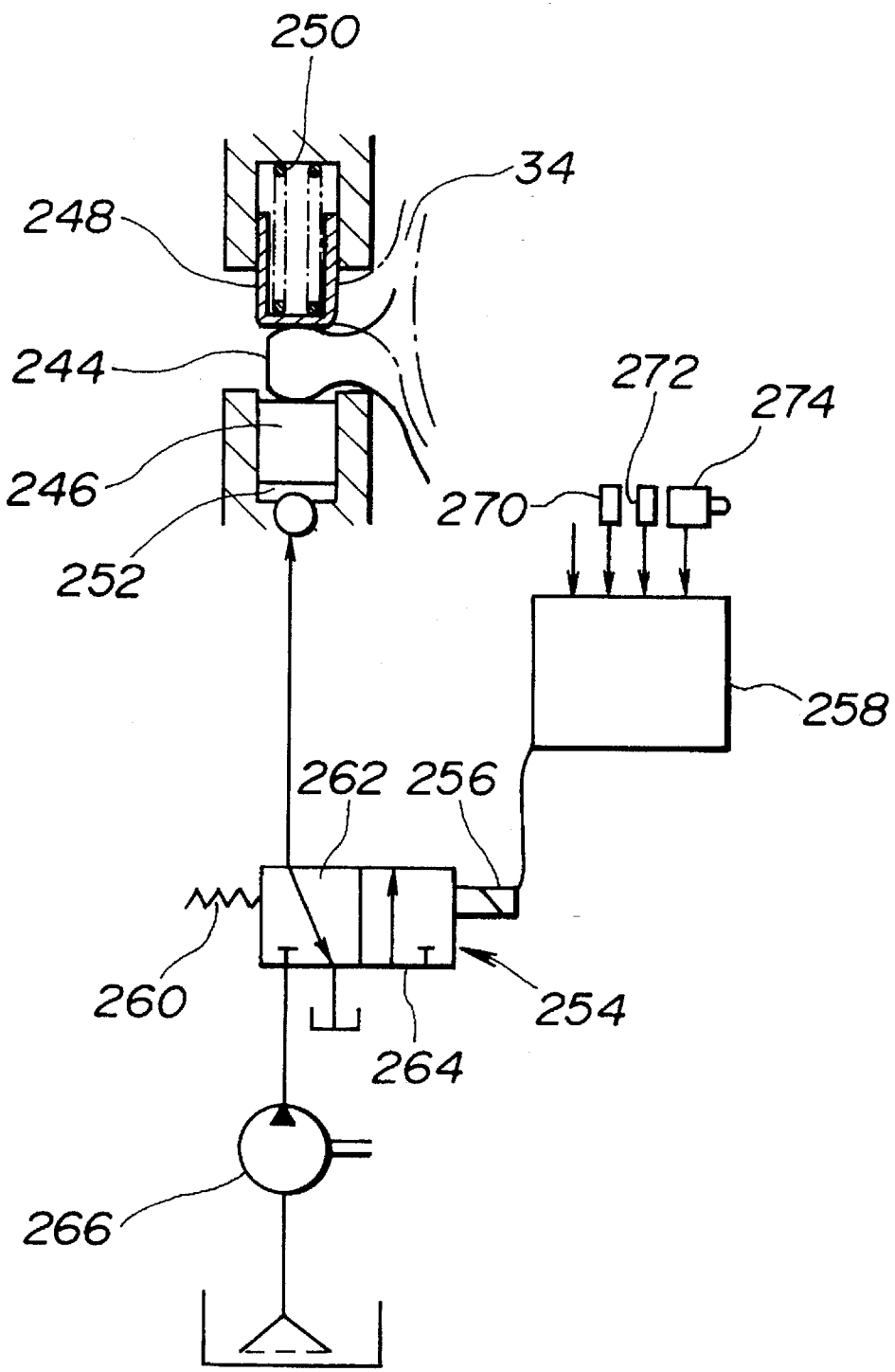
FIG. 6 is a diagram of a hydraulic system coupled with the mechanism.

Referring to FIG. 6, the piston 246 defines a chamber 252 which is connected to a solenoid operated two-position valve 254 having a solenoid 256. The solenoid 256 is connected to a microcomputer based engine controller 258. When the controller 258 outputs an OFF signal, the solenoid 256 is deenergized. Deenergization of the solenoid 256 allows a return spring 260 to condition the valve 254 to a spring set first position as diagrammatically illustrated at 262. In the first position 262, the chamber 252 is drained. When the controller 258 outputs an ON signal, the solenoid 256 is energized. Energization of the solenoid 256 shifts the valve 254 against the spring 260 to a second position as diagrammatically illustrated at 264. In the second position 264, a portion of hydraulic fluid discharged by a pump 266 which is driven by the engine crankshaft is supplied to the chamber 252. The remaining portion of the hydraulic fluid from the pump 266 is supplied to parts and portions of the engine to be lubricated.

In FIG. 6, the controller 258 is connected to a crankshaft angle sensor 270, an air flow meter 272 and a throttle opening degree sensor 274. The crankshaft angle sensor 270 generates a train of pulses, the number of which pulses per minute is indicative of the number of revolution of the crankshaft of the engine per minute. The air flow meter 272 detects flow rate of intake air admitted to the engine cylinders and generates an air flow rate indicative output signal indicative of the detected air flow rate. The throttle opening degree sensor 274 detects opening degree of the engine throttle and generates a throttle opening degree indicative output signal indicative of the detected opening degree.

During operation of the engine, the driving shaft 10 is rotated about its axis X by the toothed wheel and chain. The shaft 10 rotates the drive collar 22. The radial slot 24 is engaged by the pin 26 projecting from the disc 28 and rotates the disc 28. Through the pin 30 and the radial slot 52, the disc 28 rotates the cam 56 which controls the tappets 62 and 64 of the intake valves 66 and 68. If the axis X of the shaft 10 coincides with the axis Y of the disc 28, there is no difference in angular speed of the shaft 10 and the cam 56. The pin 30 of the disc 28, therefore, causes the radial slot 52 of the cam 56 to rotate at the same angular speed as the shaft 10.

Figure 5:
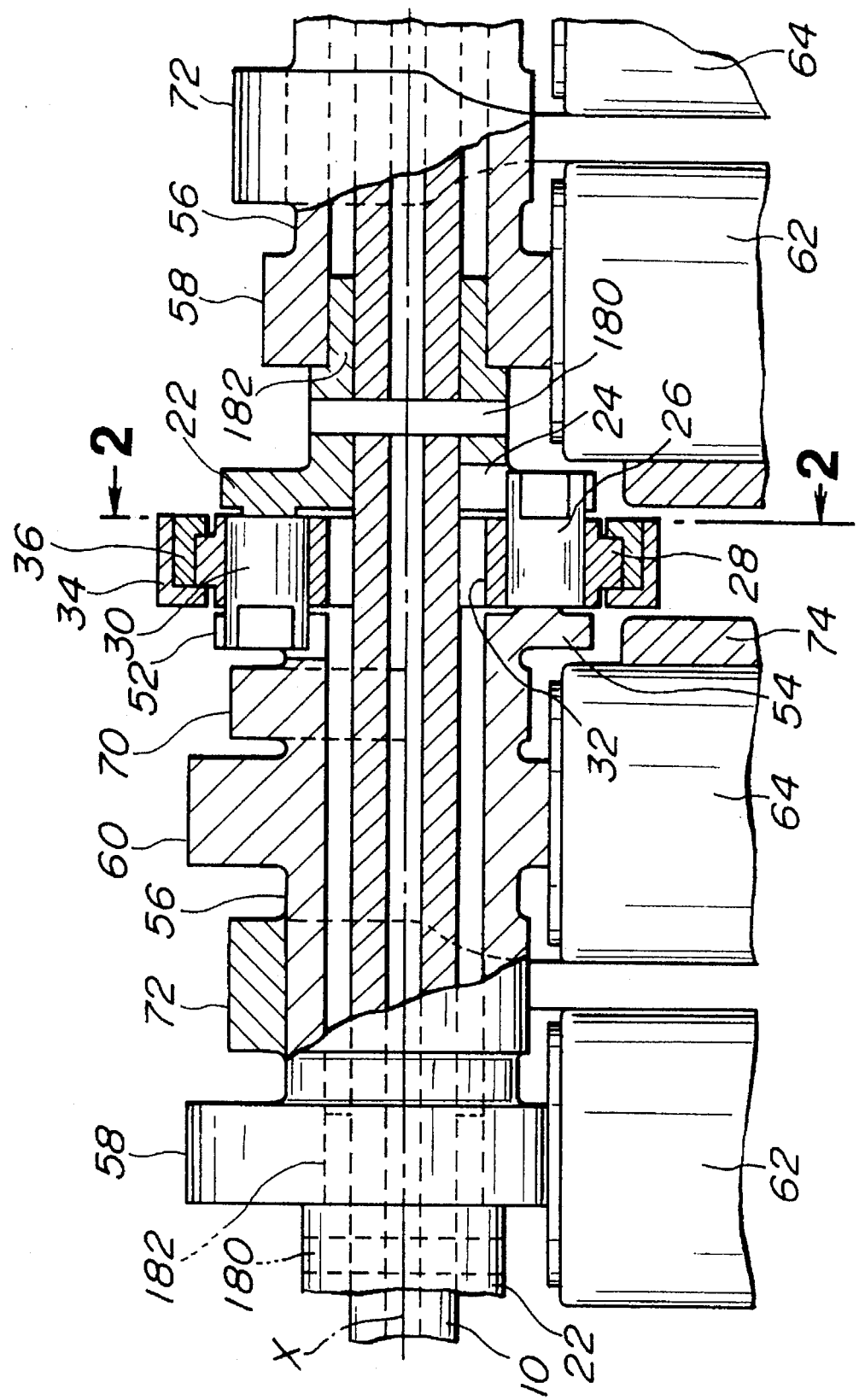
FIG. 5 is a fragmentary side view, partly broken away, of the mechanism shown in FIG. 1.

Let us now suppose that the disc housing 34 is tilted about the pivot shaft 42 and the disc 28 is moved down viewing in FIG. 5, thus producing an eccentricity between the shaft 10 and the disc 28. If the shaft 10 rotates at a constant speed, the angular speed of the disc 28 will no longer be equal to that of the shaft 10, but, in the angular position shown in FIG. 5, will be higher than that of the shaft 10. Obviously, by increasing the eccentricity, the difference in angular speed between the disc 28 and the shaft 10 can be increased. In other words, the disc 28 is at the end of an acceleration phase which has increased its angular speed to a value higher than the angular speed of the shaft 10. This value is adjustable within predetermined limits by varying the magnitude of the eccentricity.

When the mechanism is rotated through 180 degrees, the opposite situation occurs, i.e., the angular speed of the disc 28 is lower than that of the shaft 10.

From the above, it is apparent that there will be a moment in between the two situations described in which the angular speed of the disc 28 is equal to that of the shaft 10. This moment will occur whenever the radial plane including the axis Y of the disc 28 and the pins 26 and 30 is approximately perpendicular to the plane of the drawing FIG. 5.

It is evident that if the shaft 10 and the drive collar 22 rotate at the same speed, the disc 28 will accelerate or decelerate depending on the relative angular and instantaneous angular positions of the various interconnected components. In two relative angular positions, the disc 28 will rotate at a speed equal to that of the shaft 10, while its rotation speed will be higher or lower than that of the shaft 10 in intermediate angular positions.

These variations in relative speed are imparted by the transmission of motion of the disc 28 through the pin 30 and the radial slot 52 to the cam 56, with the result that the cam 56 has maximum and minimum instantaneous speeds.

From the above, it is clear that the mechanism can alter the valve duration of the intake valves 66 and 68 by directly determining the speed at which the cams 56 rotate.

Figure 8:
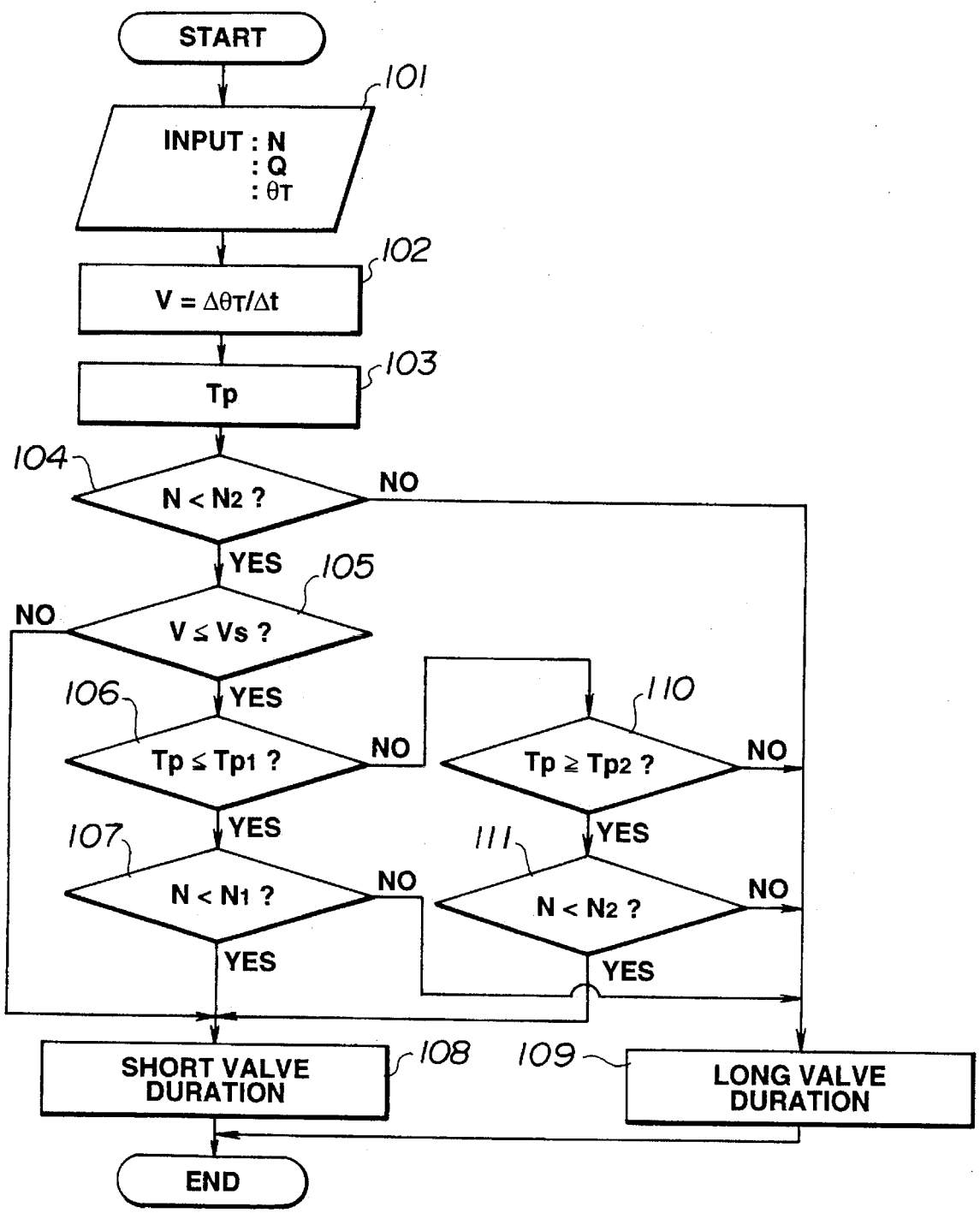
FIG. 8 is a flow diagram of a control routine implementing the invention.

The flow diagram of FIG. 8 illustrates a control routine of a preferred implementation of the invention. Along with this control routine, the controller 258 is programmed.

At input box 101, the controller 258 inputs information of engine speed N, intake air flow rate Q, and throttle opening degree $\theta_T$ by performing reading operation of output of the crankshaft angle sensor 270, air flow meter 272 and throttle opening degree sensor 274, respectively. At next box 102, the controller 258 calculates an operator power demand rate, i.e., speed V at which throttle opening degree $\theta_T$ alters. The speed V may be expressed as follows:

$$V = \text{delta } \theta_T / \text{delta } t$$

where:

delta $\theta_T$ represents a difference between newly inputted $\theta_T$ and previously inputted $\theta_T$;

and delta t represents a period of time upon expiration of which execution of the control routine is initiated.

At box 103, the controller 258 inputs information of engine load by calculating a basic fuel injection amount $T_p$ which may be expressed as follows:

$$T_p = (Q/N) \times Ke$$

where:

Ke is a coefficient.

The controller 258 next determines, at box 104, whether engine speed N is less than a predetermined engine speed value $N_2$, i.e., about 5,000 rpm. If this is the case, the controller 258 determines at box 105 whether or not throttle opening degree speed V is less than or equal to a predetermined speed value $V_S$. If this is the case, the controller 258 determines at box 106 whether or not basic fuel injection amount $T_p$ is less than or equal to a predetermined basic fuel injection amount $T_{P1}$. If this is the case, the controller 258 determines at box 107 whether or not engine speed N is less than a predetermined engine speed $N_1$, i.e., about 2000 rpm, that is lower than the value $N_2$. If this is the case, the controller 258 determines that the intake valve should be kept opened for a short valve duration (SVD) of time to fit engine operation at idling and at low speed with low load (A range in FIG. 9) and outputs an OFF signal at box 108.

Figures 7A, 7B:
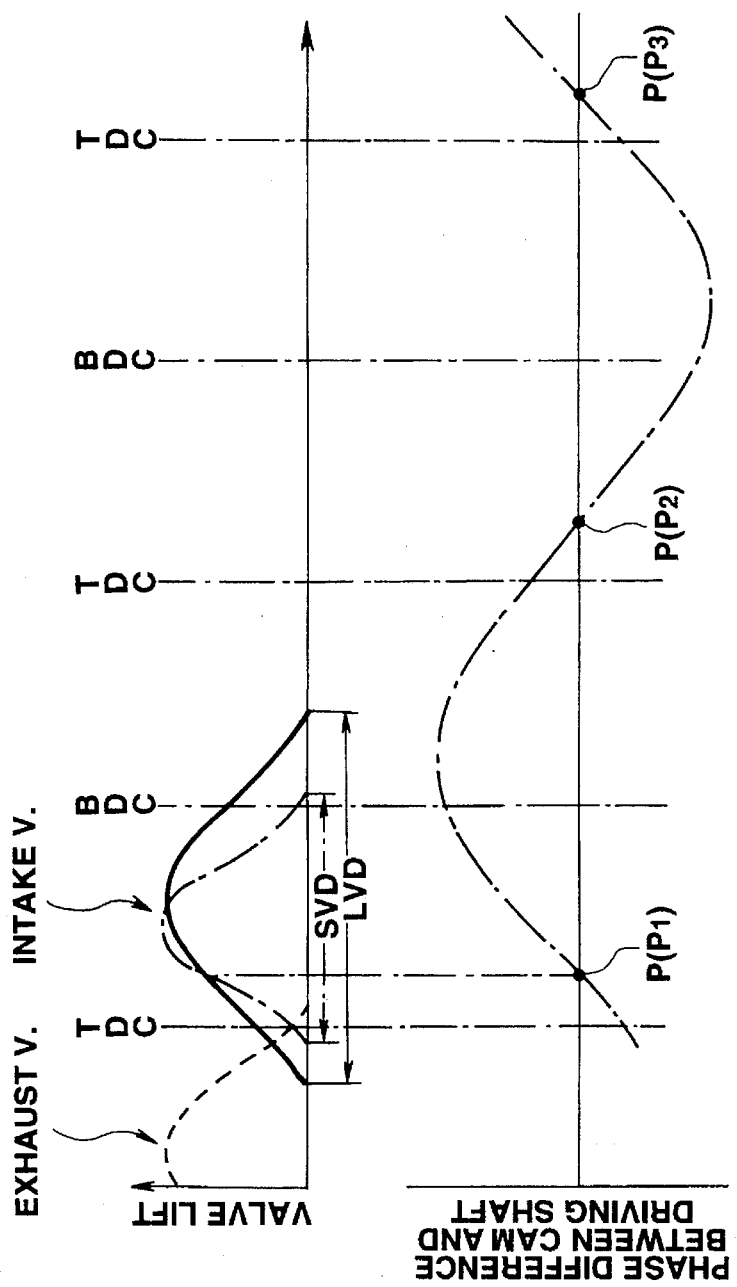
FIG. 7(A) illustrates, in broken line, a valve lift diagram of exhaust valve, in one-dot chain line one limit valve lift diagram of intake valve when the mechanism operates under eccentric condition, and, in fully drawn line, the other limit valve lift diagram of the intake valve when the mechanism operates under concentric condition.
FIG. 7(B) illustrates, in one-dot chain line, angular speed at which a cam driven by a driving shaft rotates relative to angular speed of the driving shaft when the mechanism operates under eccentric condition, and in fully drawn straight horizontal line angular speed of the cam relative to angular speed of the driving shaft when the mechanism operates under concentric condition.

Referring to FIG. 6, in response to OFF signal from the controller 258, the solenoid 256 of the solenoid valve 254 is deenergized, blocking supply of hydraulic fluid to the chamber 252 and allowing discharge of hydraulic fluid from the chamber 252. Discharge of hydraulic fluid from the chamber 252 allows the return spring 250 to move handle 244 of disc housing 34 downwardly viewing in FIG. 6, tilting the disc housing 34 about the pivot shaft 42 (see FIG. 2) to eccentric position as illustrated by one-dot chain line in FIG. 2. In this process, the axis Y of disc 28 becomes eccentric with respect to the shaft axis X of the driving shaft 10. In the eccentric position, if driving shaft 10 rotates at a constant speed, the angular speed of the disc 28 will no longer be equal to that of the driving shaft 10, but will be higher than that of the driving shaft 10 over a first turn of the driving shaft through 180 degrees, as indicated by the duration between $P_1$ and $P_2$ in FIG. 7(B), and lower than that of the driving shaft over the subsequent second turn of the driving shaft through 180 degrees, as indicated by the duration between $P_2$ and $P_3$. In FIG. 7(B), one-dot chain line drawn curve represents the angular speed of the cam 56 relative to the angular speed of the driving shaft 10.

Under this condition, the intake valve lift diagram as illustrated by the one-dot chain line in FIG. 7(A) is produced. The intake valve opens at a first opening timing before and near the top dead center (TDC) and closes at a first closing timing after and near the bottom dead center (BDC). An overlapping of the exhaust and intake periods is held small or minimum so that the residual gas in the cylinder is held at a low level, improving burning of the combustible mixture, resulting in good fuel economy.

If, at box 104, the engine speed N is not less than the value $N_2$, the controller 258 determines that the intake valves should be kept opened for a long valve duration (SVD) of time to fit engine operation at high speeds (D range in FIG. 9) and outputs an ON signal at box 109.

In response to ON signal from the controller 258, the solenoid 256 of the solenoid valve 254 is energized, allowing supply of hydraulic fluid to the chamber 252 and blocking discharge of hydraulic fluid from the chamber 252. As the pressure in the chamber 252 increases, the piston 246 moves the handle 244 of the disc housing 34 upwardly viewing in FIG. 6 against the action of the return spring 250, turning the disc housing 34, about the pivot shaft 42, to concentric position as illustrated in the fully drawn line in FIG. 2. In the concentric position wherein the axis Y of the disc 28 agrees with the shaft axis X of the driving shaft 10, the angular speed of the disc 28 is equal to that of the driving shaft 10.

Under this condition, the intake valve lift diagram as illustrated by the fully drawn line in FIG. 7(A) is produced. Comparing this valve lift diagram with that drawn by the one-dot chain line, it may be noted that, with the same valve lift, the valve duration of time, i.e., valve opening period, is prolonged. According to the valve lift diagram illustrated by the fully drawn line, the intake valve opens at a second opening timing advanced with respect to the first opening timing and closes at a second closing timing delayed with respect to the first closing timing. An overlapping of the exhaust and intake periods is held substantial or maximum. This is necessary to compensate for inertia of gas moving into and out of the engine cylinders. Thus, the engine can produce high output torque at high engine speeds.

If, at box 105, the throttle opening degree speed V is greater than the value $V_S$, the controller 258 determines at box 108 that the intake valve should be kept opened for short valve duration (SVD) of time. Since the timing at which the intake valve closes is immediately after the bottom dead center (BDC), the charging and output torque increase, resulting in improved acceleration. Since the timing at which the intake valve opens is immediately before the top dead center (TDC), the overlapping of the exhaust and intake periods is minimum, suppressing the residual gas, decreasing the probability of occurrence of knocking. Thus, an advance of spark timing may be allowed to cause an increase in engine output torque.

If, at box 106, the basic fuel injection amount $T_P$ is greater than the predetermined fuel injection amount $T_{P1}$, the controller 258 determines, at box 110, whether or not the basic fuel injection amount $T_{P2}$ is greater than or equal to a predetermined fuel injection amount value $T_{P2}$. This predetermined value $T_{P2}$ defines a lower limit of engine operation with high load and an upper limit of engine operation with middle load. Thus, the value $T_{P2}$ is greater than the value $T_{P1}$ that defines a lower limit of engine operation with middle load and an upper limit of engine operation with low load. If the basic fuel injection amount $T_P$ is greater than or equal to the value $T_P$, the controller 258 determines, at box 111, whether or not the engine speed N is less than the value $N_2$. If N is less than the value $N_2$, the controller 258 goes to box 108 and determines that the intake valve should be kept opened for short valve duration (SVD) of time to fit engine operation at low and middle speed with high or heavy load (C range in FIG. 8) and outputs OFF signal. If, at box 107, engine speed N is greater than the value $N_1$, the controller 258 determines at box 109 that the intake valve should be kept opened for long valve duration (LVD) of time to fit engine operation at middle speed with low load (B range in FIG. 9) and outputs ON signal.

If, at box 110, the basic fuel injection amount $T_P$ is less than the value $T_{P2}$, the controller 258 determines, at box 109, that the intake valve should be kept opened for long valve duration (LVD) of time to fit engine operation at low or middle speed with middle load (B range in FIG. 9) and outputs ON signal. Since the timing at which the intake valve closes is delayed after the bottom dead center (BDC), the pumping loss decreases, causing good fuel economy. Since the overlapping of exhaust and intake periods has increased, residual gas in cylinder increases to cause an increase in internal exhaust gas recirculation (internal EGR), suppressing production of NOx.

A shift from short valve duration (SVD) operation of the intake valve to long valve duration (LVD) operation of intake valve alters charging efficiency. However, the valve duration of time changes gradually and in a continuous manner for a period of time from about 0.3 seconds to 0.5 seconds, thus preventing occurrence of substantial torque shocks. Besides, the shift does not involve any change in valve lift. Since the valve lift is unaltered during the shift, a change in charging efficiency is less as compared to the case where the shift involves a change in valve lift. Thus, torque shock is less.

If, at box 111, engine speed N is not less than the value $N_2$, the controller 258 determines at box 109 that the intake valve should be kept opened for long valve duration (LVD) of time to fit engine operation at high speed with high load (D range in FIG. 9) and outputs ON signal.

Figure 9:
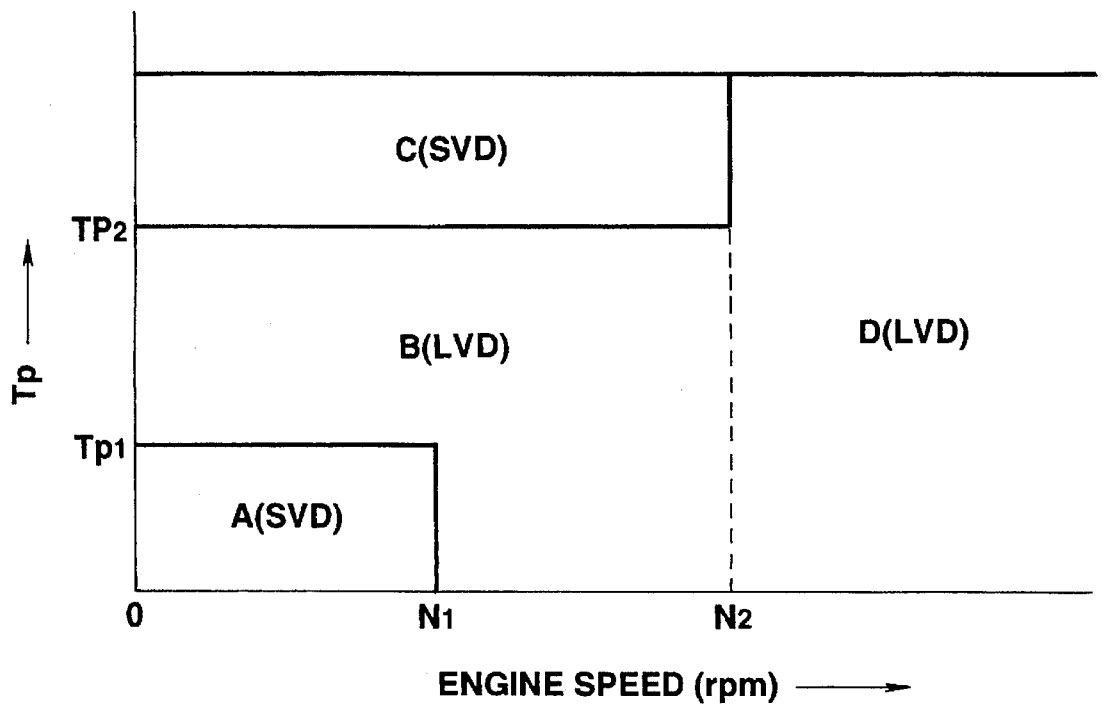
FIG. 9 is an intake valve control map illustrating a first mode how the valve duration of intake valves of the engine is varied between the two limit valve lift diagrams illustrated in FIG. 7(A)

In the case where there occurs a rapid deceleration owing to release of a gas pedal of the engine during long valve duration (LVD) operation of the intake valve in B range in FIG. 9, a quick shift from long valve duration (LVD) operation to short valve duration (SVD) operation takes place. Therefore, the timing at which the intake valve closes becomes near the bottom dead center (BDC), increasing effective intake stroke and pumping loss, causing increased engine braking.

Figure 11:
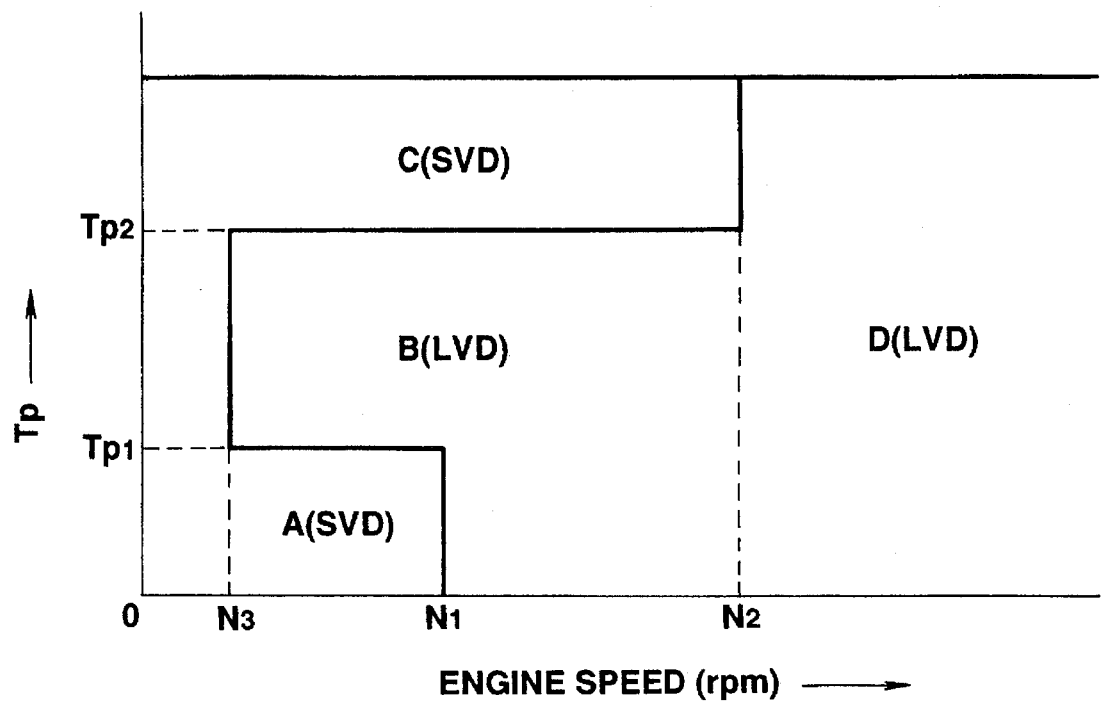
FIG. 11 is an intake valve control map illustrating a modified mode of varying the valve duration of intake valves.
Figure 10:
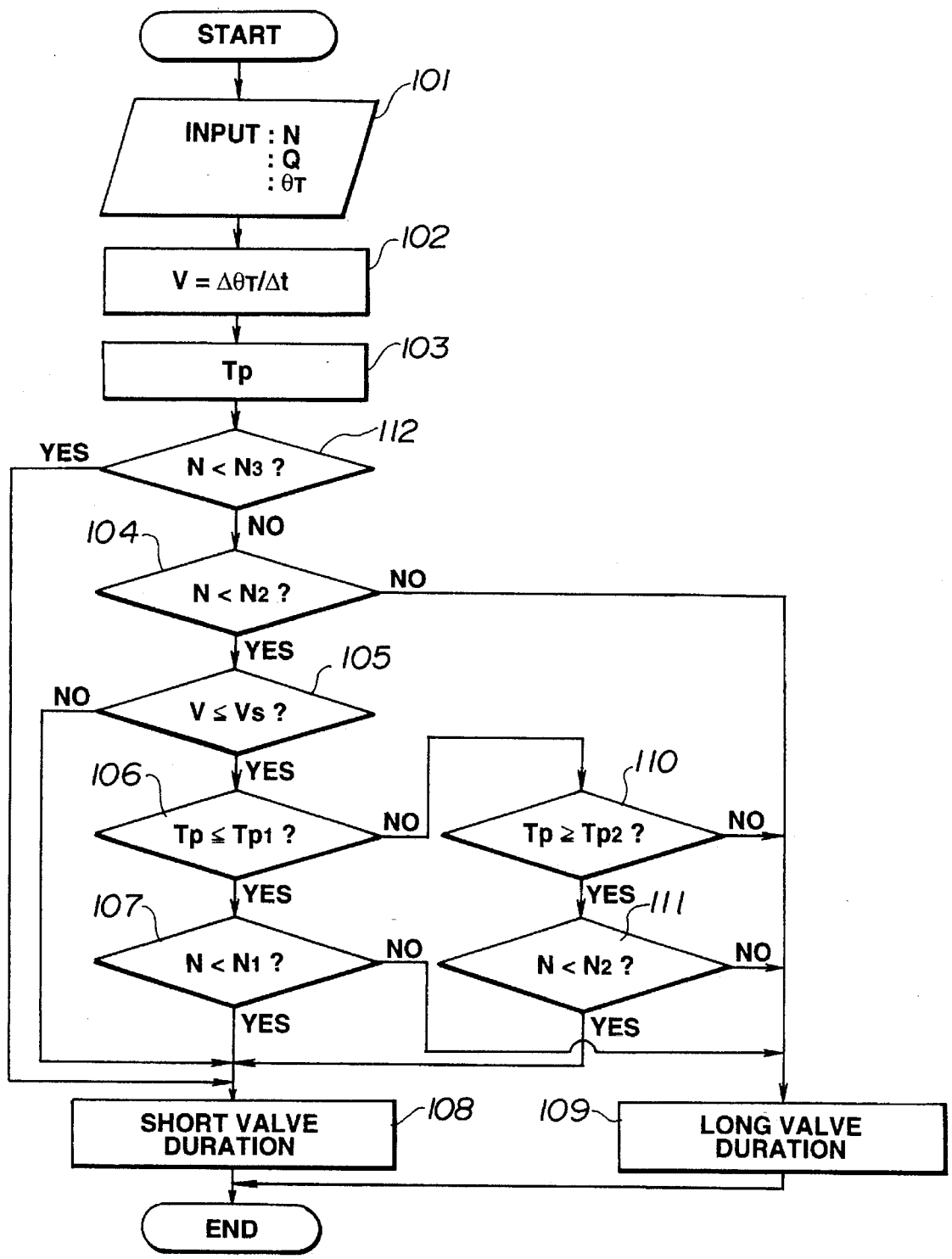
FIG. 10 is a flow diagram of a modified control routine implementating the invention.

The flow diagram of FIGS. 10 illustrates a modified control routine implementing the invention. Comparing this flow diagram with that of FIG. 8 reveals that the former is different from the latter only in the addition of box 112 between boxes 103 and 104. In FIG. 10, after determining the basic fuel injection amount $T_P$, the controller 258 determines at box 112 whether or not the engine speed is less than a predetermined engine speed value $N_3$ which is lower than the value $N_1$ that is lower than the value $N_2$ (see FIG. 11). The setting is such that the value $N_3$ may be a value falling in a range from 800 rpm to 900 rpm. If, at box 112, it has determined that the engine speed N is less than the value $N_3$, the controller 258 determines at box 108 that the intake valve should be kept opened for short valve duration (SVD) of time and outputs OFF signal. Comparing the control map of FIG. 11 with that of FIG. 8 reveals that, according to the control strategy illustrated in FIG. 10, the intake valve is kept opened for short valve duration (SVD) of time whenever the engine speed N is lower than the engine speed value $N_3$. Thus, the short valve duration (SVD) operation of intake valve is kept when the engine speed N is lower than the value $N_3$ even if there is a shift into engine operation with middle load that falls in a range from $T_{P1}$ to $T_{P2}$. Upon and after a shift from engine operation at low speed near idling to engine operation with middle load to start climbing, the short valve duration (SVD) operation of intake valve is kept and the controller 258 keeps on outputting OFF signal. During engine operation at low speed lower than the value $N_3$, the pump 266 (see FIG. 6) cannot discharge hydraulic fluid at a sufficiently high rate. Since the controller 258 outputs OFF signal to deenergize the solenoid 256 of the solenoid valve 254 to block supply of hydraulic fluid discharged from the pump 266 to the chamber 252, all of the hydraulic fluid discharged by the pump 266 can reach parts or portions of the engine to lubricate same, contributing to smooth motion of constituent parts of the engine. This results in improved response of the engine to acceleration demand. Enhanced charging efficiency owing to short valve duration (SVD) operation of intake valve is maintained during operation at low speed with middle load, thus ensuring acceleration performance with sufficient torque and good response.

What is claimed is:

1. In a system for controlling valve open duration of an intake valve of an automobile four-cycle internal combustion engine having an exhaust valve and a throttle which opens in degrees, comprising:

a cam drive mechanism including a driving shaft rotatable about a shaft axis and driven to rotate about said shaft axis in response to crankshaft rotation of the engine, and a cam in driving connection with the intake valve to open the intake valve, said cam being rotatable, about said shaft axis, relative to said driving shaft, said cam having a drive connection from said driving shaft which includes a drive member rotatable with said driving shaft, a support, and an intermediate member supported in said support for rotation about an axis thereof, said drive member being coupled with said intermediate member by a first coupling at a first position spaced from said shaft axis, and said cam being coupled with said intermediate member by a second coupling at a second position angularly spaced from the first position with respect to said shaft axis, each of said first and second coupling having a movable connection with said intermediate member to permit variation in its distance from said axis of said intermediate member during operation;

said support being positionable in response to a control signal between a concentric position in which said intermediate member is concentric with said driving shaft and an eccentric position in which said axis of said intermediate member is eccentric with said shaft axis of said driving shaft; and controller means developing said control signal for positioning said support in response to varying operating conditions of the engine, the improvement wherein:

said controller means generates said control signal for positioning said support to said eccentric position during engine operation at low speed with low load, said controller means generates said control signal for positioning said support to said eccentric position in response to a shift from engine operation at low speed with low load to engine operation at low speed with high load, and said controller means generates said control signal for positioning said support to said concentric position in response to a shift from engine operation at low speed with low load to engine operation at low speed with middle load that is higher than the low load but lower than the high load.

2. The improvement as claimed in claim 1, wherein, said controller means determines a operator power demand rate, compares said determined power demand rate with a predetermined power demand rate value, and generates said control signal for positioning said support to said eccentric position when said determined power demand rate is greater than said predetermined power demand rate.

3. The improvement as claimed in claim 1, wherein, said controller means determines a speed at which the throttle opens, compares said determined speed with a predetermined speed value, and generates said control signal for positioning said support to said eccentric position when said determined speed is greater than said predetermined speed.

4. The improvement as claimed in claim 1, wherein, when said support is positioned at said eccentric position, said cam opens the intake valve at a first opening timing near top dead center and closes the intake valve at a first closing timing near bottom dead center with the result that an overlapping of exhaust and intake open periods is held to a minimum, while, when said support is at said concentric position, said cam opens the intake valve at a second opening timing advanced with respect to said first opening timing and closes the intake valve at a second closing timing delayed with respect to said first closing timing with the result that the overlapping of the exhaust and intake open periods is held to a maximum.

5. The improvement as claimed in claim 3, wherein, when said support is positioned at said eccentric position, said cam opens the intake valve at a first opening timing near top dead center and closes the intake valve at a first closing timing near bottom dead center with the result that an overlapping of exhaust and intake open periods is held to a minimum, while, when said support is at said concentric position, said cam opens the intake valve at a second opening timing advanced with respect to said first opening timing and closes the intake valve at a second closing timing delayed with respect to said first closing timing with the result that the overlapping of the exhaust and intake open periods is held to a maximum.

6. In a system for controlling valve open duration of an intake valve of an automobile four-cycle internal combustion engine having an exhaust valve and a throttle which opens in degrees, comprising:

a cam drive mechanism including a driving shaft rotatable about a shaft axis and driven to rotate about said shaft axis in response to crankshaft rotation of the engine, and a cam in driving connection with the intake valve to open the intake valve, said cam being rotatable, about said shaft axis, relative to said driving shaft, said cam having a drive connection from said driving shaft which includes a drive member rotatable with said driving shaft, a support, and an intermediate member supported in said support for rotation about an axis thereof, said drive member being coupled with said intermediate member by a first coupling at a first position spaced from said shaft axis, and said cam being coupled with said intermediate member by a second coupling at a second position angularly spaced from the first position with respect to said shaft axis, each of said first and second coupling having a movable connection with said intermediate member to permit variation in its distance from said axis of said intermediate member during operation;

said support being positionable in response to a control signal between a concentric position in which said intermediate member is concentric with said driving shaft and an eccentric position in which said axis of said intermediate member is eccentric with said shaft axis of said driving shaft; and controller means developing said control signal for positioning said support in response to varying operating conditions of the engine, the improvement wherein:

said controller means compares an actual value of the engine speed with a first predetermined value thereof, determines an operator power demand rate when said actual value of the engine speed is less than said first predetermined value thereof, compares said determined operator power demand rate with a predetermined operator power demand rate and generates said control signal for positioning said support to said eccentric position when said determined power demand rate is greater than said predetermined operator power demand rate;

said controller means compares an actual value of the engine load with a predetermined engine load range when said determined operator power demand rate is not greater than said predetermined operator power demand rate, and generates said control signal for positioning said support to said concentric position when said actual value of the engine load falls within said predetermined engine load range;

said controller means compares said actual value of the engine speed with a second predetermined value thereof which is lower than said first predetermined value thereof when said actual value of the engine load is lower than the predetermined engine load range, generates said control signal for positioning said support to said eccentric position when said actual value of the engine speed is less than said second predetermined value thereof, and generates said control signal for positioning said support to said concentric position when said actual value of the engine speed is not less than said second predetermined value of the engine speed; and said controller means generates said control signal for positioning said support to said eccentric position when said actual value of the engine load is higher than said predetermined engine load range and said actual value of the engine speed is lower than said first predetermined value thereof.

7. In a system for controlling valve open duration of an intake valve of an automobile four-cycle internal combustion engine having an exhaust valve and a throttle which opens in degrees, comprising:

a cam drive mechanism including a driving shaft rotatable about a shaft axis and driven to rotate about said shaft axis in response to crankshaft rotation of the engine, and a cam in driving connection with the intake valve to open the intake valve, said cam being rotatable, about said shaft axis, relative to said driving shaft, said cam having a drive connection from said driving shaft which includes a drive member rotatable with said driving shaft, a support, and an intermediate member supported in said support for rotation about an axis thereof, said drive member being coupled with said intermediate member by a first coupling at a first position spaced from said shaft axis, and said cam being coupled with said intermediate member by a second coupling at a second position angularly spaced from the first position with respect to said shaft axis, each of said first and second coupling having a movable connection with said intermediate member to permit variation in its distance from said axis of said intermediate member during operation;

said support being positionable in response to a control signal between a concentric position in which said intermediate member is concentric with said driving shaft and an eccentric position in which said axis of said intermediate member is eccentric with said shaft axis of said driving shaft; and controller means developing said control signal for positioning said support in response to varying operating conditions of the engine, the improvement wherein:

said controller means compares an actual value of the engine speed with a first predetermined value thereof, and generates said control signal for positioning said support to said eccentric position when said actual value of the engine speed is less than said first predetermined value thereof;

said controller means compares said actual value of the engine speed with a second predetermined value thereof which is higher than said first predetermined value thereof, determines an operator power demand rate when said actual value of the engine speed is less than said second predetermined value thereof, compares said determined operator power demand rate with a predetermined operator power demand rate and generates said control signal for positioning said support to said eccentric position when said determined power demand rate is greater than said predetermined operator power demand rate;

said controller means compares an actual value of the engine load with a predetermined engine load range when said determined operator power demand rate is not greater than said predetermined operator power demand rate and generates said control signal for positioning said support to said concentric position when said actual value of the engine load falls within said predetermined engine load range;

said controller means compares said actual value of the engine speed with a third predetermined value thereof which is higher than said first predetermined value thereof but lower than said second predetermined value thereof when said actual value of the engine load is lower than the predetermined engine load range, generates said control signal for positioning said support to said eccentric position when said actual value of the engine speed is less than said third predetermined value thereof, and generates said control signal for positioning said support to said concentric position when said actual value of the engine speed is not less than said third predetermined value of the engine speed; and said controller means generates said control signal for positioning said support to said eccentric position when said actual value of the engine load is higher than said predetermined engine load range and said actual value of the engine speed is lower than said second predetermined value thereof.

8. A control method for an automobile four-cycle internal combustion engine having an exhaust valve and an intake valve actuated by a cam drive mechanism, the cam drive mechanism including a driving shaft rotatable about a shaft axis and driven to rotate about said shaft axis in response to crankshaft rotation of the engine, and a cam in driving connection with the intake valve to open the intake valve, said cam being rotatable, about said shaft axis, relative to said driving shaft, said cam having a drive connection from said driving shaft which includes a drive member rotatable with said driving shaft, a support, and an intermediate member supported in said support for rotation about an axis thereof, said drive member being coupled with said intermediate member by a first coupling at a first position spaced from said shaft axis, and said cam being coupled with said intermediate member by a second coupling at a second position angularly spaced from the first position with respect to said shaft axis, each of said first and second coupling having a movable connection with said intermediate member to permit variation in its distance from said axis of said intermediate member during operation, said support being positionable between a concentric position in which said intermediate member is concentric with said driving shaft and an eccentric position in which said axis of said intermediate member is eccentric with said shaft axis of said driving shaft, the control method comprising the steps of:

positioning said support to said eccentric position during engine operation at low speed with low load, positioning said support to said eccentric position in response to a shift from engine operation at low speed with low load to engine operation at low speed with high load, and positioning said support to said concentric position in response to a shift from engine operation at low speed with low load to engine operation at low speed with middle load that is higher than the low load but lower than the high load.

9. A control method for an automobile four-cycle internal combustion engine having an exhaust valve and an intake valve actuated by a cam drive mechanism, the cam drive mechanism including a driving shaft rotatable about a shaft axis and driven to rotate about said shaft axis in response to crankshaft rotation of the engine, and a cam in driving connection with the intake valve to open the intake valve, said cam being rotatable, about said shaft axis, relative to said driving shaft, said cam having a drive connection from said driving shaft which includes a drive member rotatable with said driving shaft, a support, and an intermediate member supported in said support for rotation about an axis thereof, said drive member being coupled with said intermediate member by a first coupling at a first position spaced from said shaft axis, and said cam being coupled with said intermediate member by a second coupling at a second position angularly spaced from the first position with respect to said shaft axis, each of said first and second coupling having a movable connection with said intermediate member to permit variation in its distance from said axis of said intermediate member during operation, said support being positionable between a concentric position in which said intermediate member is concentric with said driving shaft and an eccentric position in which said axis of said intermediate member is eccentric with said shaft axis of said driving shaft, the control method comprising the steps of:

positioning said support to said eccentric position during engine operation at low speed with low load to cause said cam to open the intake valve at a first opening timing before and near top dead center and close the intake valve at a first closing timing after and near bottom dead center with the result that an overlapping of exhaust and intake open periods is held to a minimum;

positioning said support to said eccentric position in response to a shift from engine operation at low speed with low load to engine operation at low speed with high load; and positioning said support to said concentric position in response to a shift from engine operation at low speed with low load to engine operation at low speed with middle load that is higher than the low load but lower than the high load to cause said cam to open the intake valve at a second opening timing advanced with respect to said first opening timing and close the intake valve at a second closing timing delayed with respect to said first closing timing with the result that the overlapping of the exhaust and intake open periods is held to a maximum.

10. A system for controlling valve open duration of an intake valve of an automobile four-cycle internal combustion engine having an exhaust valve and a throttle which opens in degrees, comprising:

a cam drive mechanism including a driving shaft rotatable about a shaft axis and driven to rotate about said shaft axis in response to crankshaft rotation of the engine, and a cam in driving connection with the intake valve to open the intake valve, said cam being rotatable, about said shaft axis, relative to said driving shaft, said cam having a drive connection from said driving shaft which includes a drive member rotatable with said driving shaft, a support, and an intermediate member supported in said support for rotation about an axis thereof, said drive member being coupled with said intermediate member by a first coupling at a first position spaced from said shaft axis, and said cam being coupled with said intermediate member by a second coupling at a second position angularly spaced from the first position with respect to said shaft axis, each of said first and second coupling having a movable connection with said intermediate member to permit variation in its distance from said axis of said intermediate member during operation;

said support being positionable in response to a control signal between a first position in which the cam opens the intake valve for a first valve open duration and a second position in which the cam opens the intake valve for a second valve open duration that is longer than the first valve open duration; and controller means developing said control signal for positioning said support in response to varying operating conditions of the engine, said controller means generating said control signal for positioning said support to the first position during engine operation at low speed with low load, said controller means generating said control signal for positioning said support to the first position in response to a shift from engine operation at low speed with low load to engine operation at low speed with high load, and said controller means generating said control signal for positioning said support to the second position in response to a shift from engine operation at low speed with low load to engine operation at low speed with middle load that is higher than the low load but lower than the high load.

* * * * *